| United States Patent [19] | [11] Patent Number: 4,794,057 |
|---|---|
| Griffin | [45] Date of Patent: Dec. 27, 1988 |

[54] SEPARATOR FOR ELECTROCHEMICAL CELLS

[75] Inventor: Rowland A. Griffin, Bedford, Mass.

[73] Assignee: Duracell Inc., Bethel, Conn.

[21] Appl. No.: 74,590

[22] Filed: Jul. 17, 1987

[51] Int. Cl.$^4$ .................. H01M 4/00; H01M 2/16
[52] U.S. Cl. ......................... 429/94; 429/254
[58] Field of Search ................... 429/94, 254

[56]  References Cited

U.S. PATENT DOCUMENTS

| 3,684,580 | 8/1972 | Lysaght | 429/254 |
| 4,221,123 | 9/1980 | Bucci et al. | 429/254 X |
| 4,327,157 | 4/1982 | Himy et al. | 429/254 X |
| 4,333,994 | 6/1982 | Urry | 429/94 |
| 4,550,064 | 10/1985 | Yen et al. | 429/254 X |

*Primary Examiner*—Brian E. Hearn
*Assistant Examiner*—Stephen J. Kalafut
*Attorney, Agent, or Firm*—Ronald S. Cornell; James B. McVeigh

[57]  ABSTRACT

This invention relates to a separator for non-aqueous electrochemical cells and in particular lithium/manganese dioxide cells. It has been discovered that a polypropylene microporous film having a thickness greater than one mil and voids greater than 50% by volume, has beneficial properties without the concomitant problems generally associated with separators having open structures.

5 Claims, No Drawings

SEPARATOR FOR ELECTROCHEMICAL CELLS

This invention relates to a separator for non-aqueous electrochemical cells and in particular lithium/manganese dioxide cells. It has been discovered that a polypropylene microporous film having a thickness greater than one mil and voids greater than 50% by volume, has beneficial properties without the concomitant problems generally associated with separators having open structures.

Separators are critical to an eletrochemical cell because they provide a physical barrier which prevents short circuits between the electrodes. At the same time a separator must have some porosity in order that electrolyte can occupy the pores to provide a reservoir of electrolyte between the electrodes. The thickness of the separator determines the distance between the electrodes, which in turn determines the resistivity of the electrolyte therebetween. Therefore, in order to minimize the electrolyte resistance it is normally considered desirable to use a thin separator. A thinner separator also permits more active material to be used in the cell.

Non-aqueous electrolytes are generally much less conductive than aqueous electrolytes. Therefore non-aqueous cells must use thinner separators than can be tolerated in aqueous cells in order to minimize the electrolyte resistance. Further, a separator useful in an alkaline cell may not be compatible with the chemicals in a non-aqueous cell. As a result, a separator which has utility in an aqueous cell is generally not useful in a non-aqueous cell.

The porosity of a separator is important in that it must be high enough to provide sufficient electrolyte between the electrodes. However, if the porosity is too high the mechanical integrity of the separator decreases and it becomes subject to tearing or breaking during manufacture. One example of a widely used commercially available separator is Celgard 2400 (Questar Corp.). This is a one mil microporous polypropylene film having 38% porosity. Another commercially available separator is Celgard 2500 which is a one mil microporous polypropylene film having 45% porosity. It is believed that the Celgard 2500 has the highest porosity of all commercially available microporous polypropylene separators.

Porosity of separators has been found to have an impact on cell safety. When a cell is abused (i.e. short circuited) it generates internal heat. As the internal temperature approaches the melting point of the polyolefin the micropores begin to close as the separator begins to melt. This results in a partial shut down of the short circuit current of the cell, which slows down the generation of heat so that the cell is less likely to vent. It is generally believed that if separators having a more porous structure than those now in common use were used the shut down charateristics would be adversely effected. This is because it has been believed that the pores would not be closed and also because some films would tend to shrink as they melt or soften. This would enable the electrodes to physically contact each other thereby increasing the short circuit problems of the cell. Rather than shutting down the flow of current and ameliorating the resulting heating, it was believed that cells using such separators would continue to heat and cause the cell to vent. Microporous films made from polymers which exhibit significantly different densities between their crystalline and amorphous phases, such as polyethylene, are generally believed to be prone to the shrinkage problem regardless of the porosity. Films made from polymers which do not have a significant difference between the densities of the crystalline and amorphous phases, such as polypropylene, appear to exhibit less of a shrinkage problem.

U.S. Pat. No. 4,335,193 discloses filled microporous films having porosities as high as 75% for use in aqueous electrochemical systems such as the lead acid type. In practice, with respect to non-aqueous systems, it has been found that filled microporous films do not shut down when a cell is short circuited. It is believed that this is due to the structural support imparted to the separator by the filler. Accordingly, these films are considered highly undesirable for use in non-aqueous cells. Therefore, a separator such as Celgard 2400 has been widely used in non-aqueous cells because its porosity is about as high as is commercially available for unfilled microporous films. Its 38% porosity has been adopted as a standard for the lithium/manganese dioxide and other cell types and has been considered heretofore to be the preferred separator in terms of cell performance, while ensuring partial shut down without shrinkage during short circuit abuse.

Unfilled separators having higher porosities than those of the film types discussed above are available with non-woven fibrous separators. Non-woven fibrous separators can have porosities in the range of 60-80%. However, these materials are generally not useful for many cell environments, especially when the electrodes with separator therebetween are tightly wound together e.g. lithium/manganese dioxide, because their open structure permits short circuits between the electrodes. To minimize the short circuit problem these separators have to be used in thicknesses of at least 6 mils. The increased separator thickness increases the resistance of electrolyte between the electrodes and takes up space which could otherwise be filled with active material whereupon the energy density would be impaired.

Microporous films of the type discussed above are used most frequently in the non-aqueous electrochemical systems. Typical of these is lithium/manganese dioxide. Within the past few years the production of lithium/manganese dioxide has increased dramatically. As production levels have increased, it has been found that in a small percentage of cells "soft shorts" occur.

A soft short is a high resistance short as distinguished from a direct short circuit. It occurs when there is a high resistance contact between the electrodes. Apparently, a particle of manganese dioxide can partially penetrate through the thin one mil Celgard 2400 separator permitting electrical contact with an anode. Since manganese dioxide is a semi-conductor, this is not a zero resistance short circuit. The effect of a soft short is to slowly drain the cell until it is totally discharged. The use of thicker separators would reduce the occurrence of soft shorts but thicker separators which also cause an undesirable increase in the internal resistance of the cell.

At Applicant's request an experimental microporous polypropylene film which is 1.5 mil thick and has 33% voids was made by a commercial supplier. Applicant tried this separator in experimental cells and found that the room temperature performance was comparable to cells with a one mil separator having 38% voids. However, it was not until Applicant tested cells at low temperature e.g. −20° C. that it was discovered that performance was adversely affected. This was attributed to the increased electrolyte resistance because of the greater thickness. This suggests that the trade off for improved cell reliability by using a thicker separator will be a decrease in low temperature performance.

It has now been discovered that lithium/manganese dioxide cells using as separator material a microporous polypropylene film having a thickness between 1.1 and 4 mil, and preferably 1.5 to 3 mils, but with at least 45%, and preferably 50-80%, and more preferably 55-70% voids performs in all respects, including low temperature discharge, at least as well as the commercially available one mil polypropylene separator with 38% voids.

The features and advantages of the present invention are evident upon consideration of the following examples.

EXAMPLE 1

The test cell for this and the following examples is a 2/3A size Li/MnO$_2$ cell. The cell uses a lithium foil anode, and an MnO$_2$ cathode having 10% by weight carbon as a conductive agent and 5% PTFE as binder. The electrodes are spirally wound with the separator interposed therebetween. The spirally wound electrodes and separator are inserted into an open ended can. The cell is filled with a non-aqueous electrolyte comprised of 1 M LiCF$_3$SO$_3$ in an approximately 1:1 ratio of propylene carbonate/dioxolane. An electrically isolated cover is sealed on the open end of the cell. The electrodes are connected to the cell can and cover respectively.

Five identical cells are built as described above, except that the separator in three cells is a polypropylene microporous film that is 1.5 mil thick and has a porosity of 33% while the other two use a microporous polypropylene film that is one mil thick and has a porosity of 38% (Celgard 2400). All five cells are tested using a low temperature ($-20°$ C.) pulse regime of 1.2 amps for 3 seconds followed by 7 seconds off. All three cells have the thicker separator deliver an average of 33% fewer pulses to a one volt cutoff than cells having the Celgard 2400 separator. As both separators have roughly the same porosity this example demonstrates the adverse impact on low temperature performance of separators thicker than one mil.

EXAMPLE 2

Two cells are built using a separator comprised of Celgard 2400 and three cells are built using a separator comprising a polypropylene microporous film that is 1.8 mil thick and has a porosity of 62%. The three cells using the thicker separator give an average of 39% more pulses to a one volt cutoff than the three cells using the thinner separator. This example demonstrates unexpected beneficial performance characteristics of cells using thicker separators with a higher porosity.

EXAMPLE 3

Two cells are built using Celgard 2400 and three cells are built using a polypropylene microporous film 1.3 mil thick and 60% porosity. The cells using the thicker separator perform as well as the cells using Celgard 2400 under the low temperature pulse test.

EXAMPLE 4

Two cells are built using a plypropylene microporous separator that is 2.8 mil thick and 55% porous. These cells deliver over 300 pulses to a one volt cut-off under the low temperature pulse test.

The previous examples clearly demonstrate the performance benefits of cells using microporous polypropylene separators having a thickness between 1.1 and 3 mils and a porosity of between 50% and 80. While a microporous separator with these voids but with a thickness of 4 mil or greater would be operable, such thicknesses are not preferred because the separator would take up too much space. Because of the greater thickness over Celgard 2400, the separators of the present invention are expected to reduce the scrap rate of cells due to soft shorts without detrimentally affecting the low temperature performance. The separators encompassed by the present invention offer a significant advancement in the manufacture of spirally wound lithium/manganese dioxide cells.

What is claimed is:

1. An electrochemical cell comprising a sealed casing; an anode, a cathode, a separator positioned between said anode and said cathode, and a non-aqueous electrolyte sealed in said casing; a pair of electrical terminals on said casing; means for electrically isolating the electrical terminals from each other; and means for electrically connecting the anode to one terminal and the cathode to the other terminal; wherein the anode is comprised of lithium foil, the cathode is comprised of manganese dioxide, and said separator consists essentially of a microporous polypropylene film having a thickness of about 1.5 mils and internal voids of about 60% by volume; wherein said anode, cathode, and separator are spirally wound together in a jelly roll configuration.

2. An electrochemical cell comprising an anode comprised of lithium; a cathode comprised of manganese dioxide; and a non aqueous electrolyte; wherein said separator is comprised of a microporous polypropylene film having a thickness between 1.1 and 4.0 mils and internal voids of between 50% and 80% by volume.

3. The electrochemical cell of claim 2 wherein the thickness of the separator is between 1.5 and 3 mils.

4. The electrochemical cell of claim 3 wherein the internal voids are between 55% and 70% by volume.

5. The electrochemical cell of claim 4 wherein the anode, the cathode, and the separator are spirally wound together with the separator between the anode and cathode.

* * * * *